United States Patent [19]
Kondo et al.

[11] Patent Number: 4,863,039
[45] Date of Patent: Sep. 5, 1989

[54] APPARATUS AND METHOD FOR HANDLING A FLEXIBLE DISK FOR TESTING

[75] Inventors: Thomas J. Kondo, Phoenix; James F. Kusbel, Scottsdale; John D. Philp, Phoenix, all of Ariz.

[73] Assignee: Three Phoenix Company, Phoenix, Ariz.

[21] Appl. No.: 565,038

[22] Filed: Dec. 23, 1983

[51] Int. Cl.⁴ .................... B07C 5/344; G01R 33/12
[52] U.S. Cl. .................... 209/538; 209/567; 209/573; 209/933; 324/212; 360/25; 360/99.01; 369/58
[58] Field of Search ................ 324/210–212, 324/262; 360/73, 71, 31, 97, 99, 25; 369/53, 58; 209/538, 546, 549, 551, 552, 558, 562–564, 567, 568, 571, 573, 600, 655, 698, 706, 914, 933; 271/149, 150; 364/481, 579, 580

[56] References Cited

U.S. PATENT DOCUMENTS

| | | | |
|---|---|---|---|
| 3,631,335 | 12/1971 | Carr et al. | 324/212 |
| 3,673,584 | 6/1972 | Farrand | 324/208 X |
| 3,686,682 | 8/1972 | Behr et al. | 324/212 X |
| 3,984,763 | 10/1976 | Koester et al. | 324/212 |
| 4,074,258 | 2/1978 | Doré et al. | 250/231 SE |
| 4,110,610 | 8/1978 | Mueller et al. | 250/231 SE |
| 4,121,156 | 10/1978 | Olson | 324/210 |
| 4,504,871 | 3/1985 | Berwick et al. | 324/210 X |

FOREIGN PATENT DOCUMENTS 063574 4/1984 Japan .................... 324/210

OTHER PUBLICATIONS

Fletcher et al., "Automated Multiple-Head Disk Testing Machine", IBM/TDB, vol. 22, No. 3, Aug. 1979, pp. 907–909.

Shidler, "Measurement of Frequency Response of Magnetic Transducers", IBM/TDB, vol. 18, No. 9, Feb. 1976, pp. 3000–3001.

Primary Examiner—Robert B. Reeves
Assistant Examiner—Edward M. Wacyra
Attorney, Agent, or Firm—Harry M. Weiss

[57] ABSTRACT

Apparatus and method are disclosed for handling a flexible disk for testing. The apparatus includes guide rails for initially positioning a disk for test. The apparatus also includes a variable speed motor for rotating the disk at a preselected rotation speed. The disk is rotated by clamping the disk between a motor driven rotating spindle and a retractable collet. The collet passes through an aperture in the disk to center and position the disk. Testing is accomplished by a test head assembly which is moved by a voice coil actuator. Positioning of the test head assembly is controlled by a light detector and ground glass scale coupled to the actuator and to the test head assembly.

29 Claims, 2 Drawing Sheets

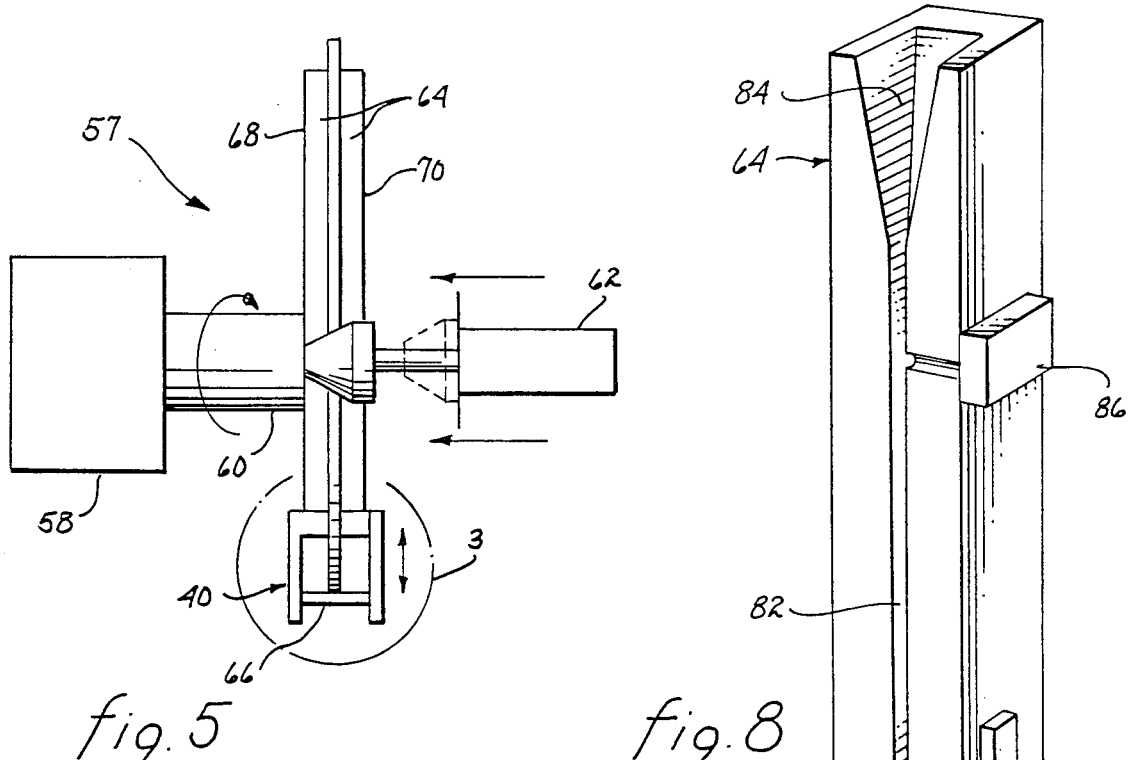
fig. 5
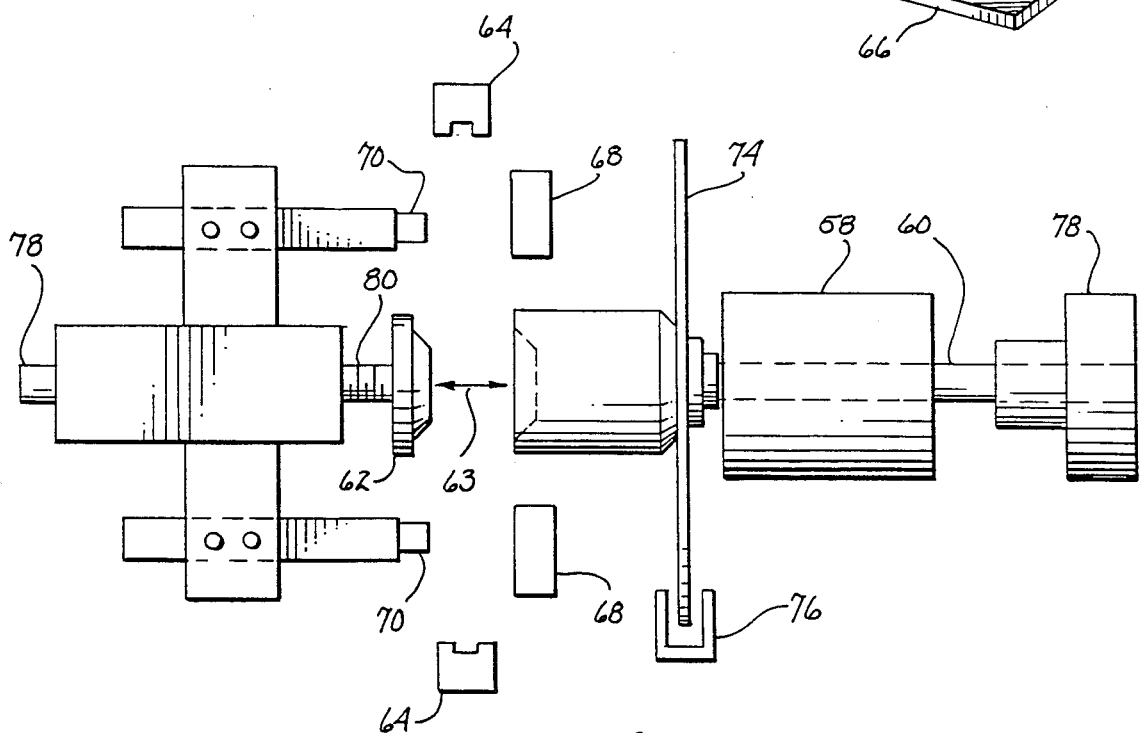
fig. 8
fig. 7

APPARATUS AND METHOD FOR HANDLING A FLEXIBLE DISK FOR TESTING

BACKGROUND OF THE INVENTION

This invention relates generally to apparatus and method for testing flexible disks, and more specifically to automated equipment and method for testing flexible disks.

Field of the Invention

Flexible disks are used for mass storage in computer applications. The disks may be, for example, 5¼ inches in diameter, 8 inches in diameter, or about 3 inches in diameter. The disks are used to store many thousands of bytes of computer information. In some applications, information is stored on one side of the disk, while in other applications information is stored on both sides of the disk. Information storage must be precise and totally accurate. This requires that the disk, in turn, be of high quality and without flaws. To insure that disks are of such quality, each disk used in a computer application must be carefully tested and screened for quality control.

Disk testing can be time consuming, which, of course, adds to the final cost of the disk. To reduce the testing costs, it is imperative that disk testing be done as rapidly as possible and with as little operator input as possible. The disks contain a high density of information stored in closely spaced tracks on the disk surface. In testing the disks, it is necessary that the disks be quickly and precisely located in the test apparatus and then rotated at a precisely known rotational rate. It is also necessary that the test heads used in the disk testing be accurately positioned on a known track on the disk surface. There is, therefore, a need for a testing apparatus and method which would automatically and precisely position and rotate disks and position the test heads to test a plurality of flexible disks in a rapid and accurate manner without requiring large amounts of operator handling.

It is therefore an object of this invention to provide an improved apparatus and method for positioning flexible disks for test.

It is another object of this invention to provide improved apparatus and method for clamping and rotating flexible disks during test.

It is yet another object of this invention to provide improved apparatus and method for positioning test heads relative to the surface of a flexible disk being tested.

It is a further object of this invention to provide apparatus and method for testing flexible disks in a standard disk jacket.

BRIEF SUMMARY OF THE INVENTION

The foregoing and other objects and advantages of the invention are achieved with the disk testing apparatus and method, both in accordance with the invention. The disk testing apparatus includes guides for initially positioning a disk for test and clamps for holding the disk jacket while allowing the disk to rotate within the jacket. The apparatus includes a variable speed motor for rotating the disk at the proper test speed. The motor has a rotatable shaft with a spindle cup at the end. The disk is firmly held against the spindle cup by an idler collet which passes through the aperture in the center of the disk. The collet centers and positions the disk and holds it against the rotating spindle cup.

Testing is accomplished by a test head assembly which contacts the disk surfaces. The assembly is moved precisely over the disk surface by a voice coil actuator assembly. Position is controlled by an optical detector and an etched glass scale which moves with the head assembly.

BRIEF DESCRIPTION OF THE DRAWINGS

FIG. 5 illustrates the test apparatus including motor drive and test head assembly;

FIG. 7 illustrates, in top view, the test apparatus including the disk motor drive; and FIG. 8 illustrates a disk guide rail.

DETAILED DESCRIPTION OF THE INVENTION

Figure 1:
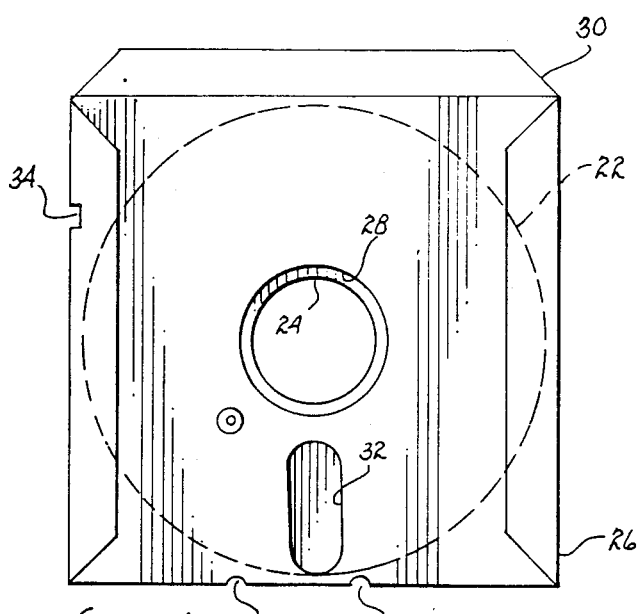
FIG. 1 illustrates a flexible disk to be tested in its standard jacket.

FIG. 1 illustrates a standard 5.25 inch double sided flexible disk 22. It is just such a disk that is intended to be tested by the test apparatus herein described. The apparatus, however, can be adapted for the testing of similar disks of different size by appropriate changes in the size of the apparatus. Disk 22 has an aperture 24 through the center thereof. The disk is contained in a standard disk jacket 26 which also has an aperture 28 through the center thereof exposing the aperture 24 in the disk. The standard disk jacket that is referred to is the American National Standard Institute (ANSI) jacket specified in their document number X3B8/82-39 dated June 11, 1982. The disk is preferably tested with its top flap opened or in the unsealed position to permit easier access to the disk contained therein, but testing is also possible with the flap closed or sealed. Jacket 26 is here shown with jacket flap 30 in the open or up position. The jacket also includes a head window opening 32 which exposes a portion of the tracks on the surface of disk 22. A Write Control notch 34 appears on the upper portion of one side of the jacket. This notch is operative during normal use of the disk in a read/write mode. Relief notches 36 also appear at the bottom of the disk jacket.

Figure 2:
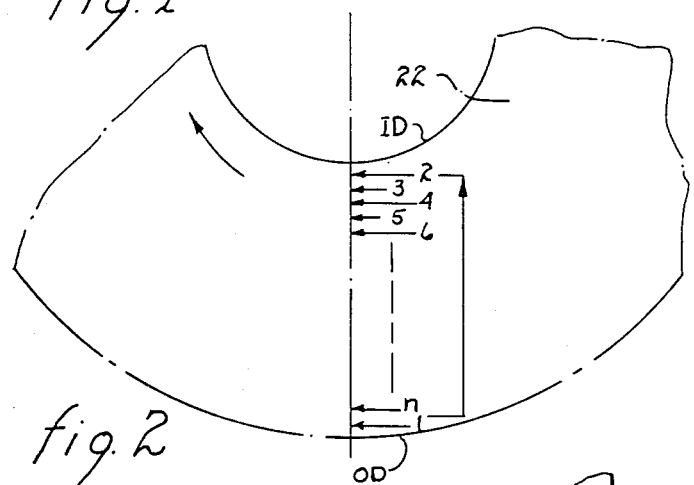
FIG. 2 illustrates track locations tested on a flexible disk.

FIG. 2 illustrates the position and numbering of tracks on disk 22. Tracks are numbered from an OD at the outside of the disk to an ID located at the inside of the disk. The numbers shown in FIG. 2 depict the preferred order in which the tracks are tested. Standard track increments are only 0.020833 inch, track center-to-track center, for 48 track per inch disk and 0.010417 inch for 96 track per inch disk. Accordingly, with such fine incremental spacing, it is necessary that very precise positioning of the head assembly be maintained.

Figure 3:
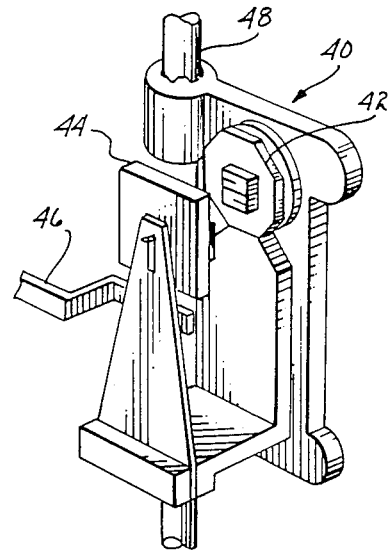
FIG. 3 illustrates, in perspective view, a test head assembly.

FIG. 3 illustrates a preferred test head assembly 40 for testing each of the flexible disks. Test head assembly 40 includes a first fixed test head pair 42 and a second spring load test head pair 44. During testing, the test heads are positioned to contact the front and rear surfaces of the flexible disk through the head window openings in the disk jacket and thus allow simultaneous testing of both sides of the disk. Spring loaded disk head 44 causes the two heads to be in firm contact with the disk surfaces. A lever 46 is available for manually pulling the spring loaded disk head out of contact with the disk. The disk head assembly is physically attached to shaft 48. Means (in the form of arm 50, FIG. 4) controls the vertical movement of the head assembly as explained more fully below.

Figure 4:
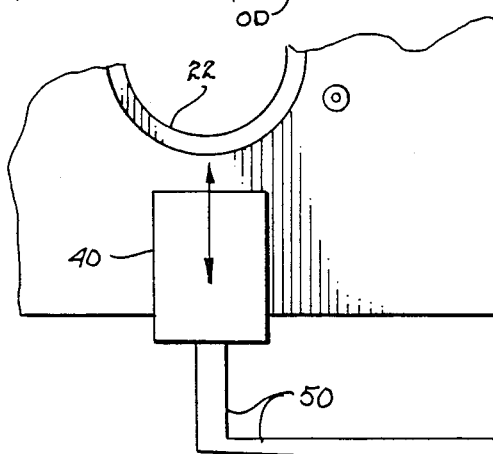
FIG. 4 illustrates position of the test head assembly during test and of drive means for moving the test head assembly.

FIG. 4 schematically illustrates the vertical movement of the head assembly. Vertical movement is controlled by arm 50 which is connected to an air bearing assembly (not shown) that is coupled to and responsive to the movement of voice coil assembly 52 or actuator drive. Precise and controlled vertical movement of the head assembly is required to ensure that the heads are in contact with the correct track on disk 22. The precise control of the vertical movement is obtained through the use of a voice coil actuator drive 52 coupled with a ground glass scale 54 and a photo optical detector 56.

The head assembly and its associated movement mechanisms are mounted on a head assembly carriage (not shown) which allows the movement of the head assembly into and out of the plane of the flexible disk for testing and disk release after testing, respectively. The carriage is moved, for example, by air cylinders. When positioned in the place of the disk, the head assembly is moved to the correct track for testing by the voice coil driven air bearing assembly.

FIG. 5 illustrates in side view the test apparatus 57 in accordance with the invention. Test apparatus 57 includes a fixed mount drive motor 58 which provides a controlled rotation of disk drive spindle 60, and a retractable cone-nosed idler collet 62. The disk is dropped into a frame 64 having channel shaped sides and moveable bottom stop means 66 for initially limiting the vertical travel of the disk.

Motor 58 has a programmable speed range from about 60 to about 1500 rpm. During loading of a disk into the test station the motor slows to a speed of about 300 rpm. Spindle 60 is driven directly from motor 58 so it also turns at the motor speed. Spindle 60 has a spindle cup located at its end for mating with the cone-nosed idler collet 62. During loading of a disk, idler collet 62 is in the retracted position. After the disk has dropped into position against bottom stops 66, the cone-nosed collet is extended through the disk aperture to the opposite spindle cup, gently centering and seating the disk between the spindle flanges with no distortion. The spindle drive speed is then controlled to a test speed of about 600 rpm to rotate the disk at this test speed. This disk loading takes only a short period of time.

During the insertion of the collet into the disk aperture, the disk jacket is clamped to hold and flatten the disk jacket but to allow the disk to rotate within the jacket. Jacket clamping is accomplished by a fixed anvil 68 positioned along the spindle side of the disk and a flexible pad 70 attached to and moving with collet 62. The pad forces the disk jacket gently but securely against the anvil.

Test station 57 also includes the read/write head assembly 40 discussed above. During the time when the disk is dropping into the test station and is being clamped between spindle 60 and collet 62, test head 40 is raised into position to place test heads against the disk through disk head windows 32 in disk jacket 26.

The disk is tested and the test results are stored for later use. After testing, the speed of motor 58 is controlled to, for example 300 rpm, collet 62 is withdrawn from aperture 24, pad 70 is retracted to release the pressure on the disk jacket, test head 40 is lowered out of contact with the disk and moved horizontally to a position which is not directly beneath the disk, and the bottom stop means 66 are moved to allow the tested disk to drop from the test apparatus. The stop means 66 are preferably one or more moveable disk stop levers which are moveable by solenoids in response to a signal from a controlling microprocessor unit. The levers are pulled out of position to allow the disk to drop from the apparatus.

Figure 6:
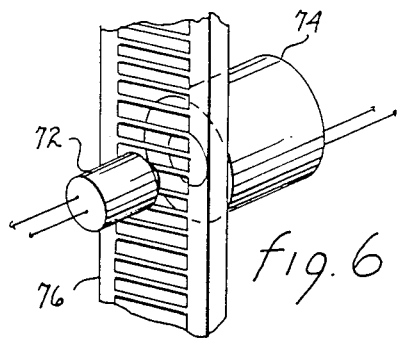
FIG. 6 illustrates a ground or etched glass scale and photo optical detector for positioning the test head assembly.

FIG. 6 illustrates the etched or ground glass scale 54 and photo optical detector used for obtaining the precise positioning needed to move the head assembly controllably from track to track. The photo optic detector includes a light source 72 and a photo detector 56. Light from the source shines through the glass scale to the detector 56. Each track on the disk is represented by an interval of a specified number of grating lines on the glass scale. Track positioning is accomplished by a signal supplied to the voice coil actuator 52. The detector is coupled to the actuator and reads the grating lines on the glass scale, generating a clock pulse for each line counted. In moving up or down by one track, grating lines are counted and the voice coil movement is stopped after a desired number of up or down clock pulses have been received. The actual counting of pulses and control of the voice coil is controlled by a microprocessor unit.

FIG. 7 illustrates, in top view, the disk motor drive in more detail. Spindle 60 having spindle cup 61 fixed at the end thereof is driven by a variable speed D.C. motor 68. Cone-nosed idler collet 62, here shown in the retracted position, is moveable in the direction shown by arrow 63. When moved to a fully extended position, the collet extends through the aperture in the disk to be tested and engages with the spindle cup 61. The flexible disk is thus clamped between the spindle cup and collet and rotates with spindle 60. Also attached to spindle 60 is a rigid disk 74 having a plurality of holes spaced about its periphery. As the spindle rotates, so also does the rigid disk. The rotational speed of the rigid disk, and thus of the spindle, is measured by a detector 76. The detector senses the passage of the disk holes by optical, magnetic, or other detecting means. The spindle speed and the flexible disk speed are thereby monitored and controlled. Control is accomplished by feeding the detector results to a controlling microprocessor unit. To help in maintaining and stabilizing the spindle speed at a constant rotational speed, a flywheel 78 is also attached to spindle 60.

Guide rails 64 provide the initial positioning for a flexible disk dropped into the test apparatus. The disk is dropped into the test apparatus with idler collet 62 retracted and with spindle 60 rotating at a low and controlled speed, such as 300 rpm. The disk is positioned by guide rails 64 and the idler collet is extended to pass through the disk aperture to center and finely position the disk. As the idler collet is moved to the contact position, cushioned anvil pads 70, mounted with the collet, are also moved to the contact position. The disk jacket is firmly clamped between anvil 68 and anvil pads 70. This clamping holds and flattens the disk jacket, but allows the rotation of the disk within the jacket. Movement of the collet and anvil pads is achieved, for example, by an air driven cylinder 78. Action of the air cylinder is controlled by a controlling microprocessor unit. Collet 62 is spring loaded by spring 80 to ensure the proper clamping force.

FIG. 8 illustrates one of the guide rails 64 in more detail. The guide rail comprises a channel-shaped member having parallel guiding edges at the bottom position 82. The guiding edges curve outwardly at the top portion 84 to guide the flexible disk into position. An optical sensor 86 detects the presence of a disk in the testing apparatus. Stop 66 is retractable to allow a tested disk to drop from the test apparatus. Bottom stop 66 is retractable by means, for example, of an electric solenoid (not shown).

Thus it is apparent that there has been provided, in accordance with the invention, an automated test apparatus and method for the testing of flexible disks which fully meets the objects and advantages set forth above. The invention has been described by reference to specific illustrative embodiments, but it is not intended that the invention be limited to these illustrative embodiments. Those skilled in the art will recognize, after review of the foregoing discussion, that variations and modifications differing from the illustrative embodiments are possible without departing from the spirit and scope of the invention. Accordingly, it is intended to encompass all such variations and modifications that fall within the appended claims.

We claim:

1. Apparatus for handling a flexible disk for testing and for mounting in a disk text fixture, said disk contained in a disk jacket and having an aperture through the center thereof, said apparatus comprising:
   means for initially positioning a disk and into which said disk can drop, said means including guide rails for engaging sides of said disk jacket and stops for controlling the vertical position of said disk and disk jacket, said stops being moveable to allow said disk to drop from said initial position after testing;
   means for clamping said jacket to allow said disk to rotate therein;
   means for rotating said flexible disk including motor means having a rotatable spindle driveable thereby;
   a spindle cup positioned on said rotatable spindle; and
   a moveable idler collet for mating with said spindle cup, said collet retractable to a position to allow initial positioning of said disk and advanceable to a position to allow clamping of said disk between said collet and said spindle cup.

2. The apparatus of claim 1 wherein said idler collet is cone-shaped having a size to pass through said aperture to position said disk.

3. The apparatus of claim 2 wherein said idler collet is shaped to mate with said spindle cup.

4. The apparatus of claim 3 wherein said idler collet is spring loaded to maintain a pressure against said disk.

5. The apparatus of claim 1 wherein said guide rails include a portion having parallel sides and an upper portion having outwardly flaring sides to guide said disk and disk jacket into said portion having parallel sides.

6. The apparatus of claim 1 wherein movement of said stops is controlled by a solenoid.

7. The apparatus of claim 1 wherein said means for clamping comprises a fixed anvil portion and a moveable portion.

8. The apparatus of claim 7 wherein said moveable portion comprises a flexible material.

9. The apparatus of claim 1 wherein said motor means comprises a variable speed motor.

10. The apparatus of claim 9 wherein said variable speed motor comprises a D.C. motor.

11. The apparatus of claim 9 further comprising motor speed monitoring means.

12. The apparatus of claim 11 wherein said motor speed monitoring means comprises:
    a rigid disk mounted to said rotatable spindle and rotating therewith, said rigid disk having a plurality of holes positioned about the circumference thereof; and
    means for measuring the speed of rotation of said rigid disk by detecting the passage of said plurality of holes.

13. The apparatus of claim 12 wherein said means for measuring comprises optical means.

14. The apparatus of claim 12 wherein said means for measuring comprises electronic means.

15. The apparatus of claim 1 further comprising:
    a disk test head assembly for testing said disk; and
    means for positioning said disk test head assembly in contact with said disk.

16. The apparatus of claim 15 wherein said means for positioning comprises:
    a voice coil magnet assembly for moving said disk test head assembly; and
    a lamp detector assembly.

17. The apparatus of claim 16 wherein said lamp detector assembly comprises:
    a light source;
    an etched glass scale moveable in response to movement of said disk test head assembly; and
    a detector for detecting position of said disk test head assembly by detecting light from said light source passing through said etched glass scale.

18. The apparatus of claim 17 wherein said detector, said voice coil magnet, said means for clamping, said motor means, and said idler collet are microprocessor controlled.

19. A method for handling a flexible disk, for testing said disk contained in a disk jacket, having two substantially flat major surfaces, and having an aperture through the center thereof, said method comprising the steps of:
    positioning said disk in a test apparatus;
    clamping said disk to a rotatable spindle;
    clamping said disk jacket to allow rotation of said disk therein;
    rotating said disk at a selected rotational speed for testing;
    positioning a test head assembly to contact said disk to testing;
    reducing the rotational speed of said disk;
    removing said test head assembly from contact with said disk;
    unclamping said disk from said spindle; and
    allowing said disk to drop from said test apparatus.

20. The method of claim 19 wherein said step of positioning said disk comprises:
    providing a guide rail assembly having parallel guiding sides; and
    dropping said disk into said assembly between said sides.

21. The method of claim 20 wherein said step of positioning said disk further comprises providing a solenoid operated stop to limit the vertical position of said disk.

22. The method of claim 21 wherein said step of allowing said disk to drop comprises moving said stop out of said position to limit said vertical position.

23. The method of claim 19 wherein said step of clamping said disk comprises the steps of:
providing a retractable cone-nosed collet;
dropping said disk into said apparatus with said collet in a retractable position; and
advancing said collet to an extended position with said collet passing through said aperture to capture said disk between said collet and said spindle.

24. The method of claim 19 wherein said test head assembly comprises a pair of test heads and said test heads contact two major surfaces of said disk.

25. A method for handling a flexible disk for testing, said disk having an aperture through the center thereof, the method which comprises the steps of:
dropping a flexible disk vertically downward into a test apparatus;
initially positioning said disk in said test apparatus;
providing a rotating spindle;
providing a retractable collet having a mating relationship with the end of said spindle;
inserting said collet through the aperture and into said mating relationship to clamp said disk between said collet and said spindle to cause said spindle to rotate with said spindle;
controlling the rotational speed of said spindle and said disk at a selected test rotational speed;
placing a test head assembly in contact with a surface of said disk to test said disk;
removing said test head assembly from contact with said surface; and
releasing said disk to allow said disk to drop vertically downward from said test apparatus.

26. Apparatus for handling a flexible disk for testing, said flexible disk contained in a disk jacket and having an aperture through the center thereof, said apparatus comprising:
guide means for positioning a flexible disk dropped into said apparatus;
means for clamping the disk jacket of said flexible disk and allowing rotation of said disk therein;
means for rotating said flexible disk including motor means having a rotatable spindle capable of rotating at a prescribed test rotation speed;
collet means for clamping said flexible disk against said rotatable spindle;
test head assembly means for placing a test head against a surface of said flexible disk; and
positioning means for positioning said test head assembly at a selected test track of said flexible disk surface; and
means for discharging said flexible disk downwardly from said apparatus.

27. The apparatus of claim 26 wherein positioning means comprises a light source, light detector, and etched glass scale coupled to said test head assembly.

28. The apparatus of claim 27 wherein said test head assembly is moved by a voice coil actuator.

29. The apparatus of claim 28 wherein said voice coil actuator is coupled to said positioning means.

* * * * *